United States Patent [19]

Thor et al.

[11] 4,394,939

[45] Jul. 26, 1983

[54] DISPENSER CONTAINER FOR VISCOUS FLUIDS

[75] Inventors: Günter Thor, Krefeld-Traar; Albert Stöffler; Dietholf Mehl, both of Düsseldorf, all of Fed. Rep. of Germany

[73] Assignee: Henkel Kommanditgesellschaft auf Aktien, Düsseldorf-Holthausen, Fed. Rep. of Germany

[21] Appl. No.: 226,149

[22] Filed: Jan. 19, 1981

[30] Foreign Application Priority Data

Sep. 22, 1980 [DE] Fed. Rep. of Germany ....... 3035728

[51] Int. Cl.³ .................. B65D 83/00; B65D 37/00
[52] U.S. Cl. .................. 222/207; 222/212; 222/383; 222/494; 222/517; 137/854
[58] Field of Search ............. 222/207, 209, 212, 215, 222/335, 383, 385, 387, 491, 494, 512, 515, 517, 518; 137/854

[56] References Cited

U.S. PATENT DOCUMENTS

| 666,145 | 1/1901 | Kennedy | 137/854 X |
| 3,361,305 | 1/1968 | Spatz | 222/207 |
| 3,462,046 | 8/1969 | Bartels | 137/854 X |
| 3,828,985 | 8/1974 | Schindler | 222/207 |

FOREIGN PATENT DOCUMENTS

| 696571 | 9/1940 | Fed. Rep. of Germany | 137/854 |
| 2901717 | 7/1980 | Fed. Rep. of Germany | 222/383 |

Primary Examiner—Charles A. Marmor
Attorney, Agent, or Firm—Hammond & Littell, Weissenberger and Muserlian

[57] ABSTRACT

This invention is directed to a dispenser for viscous fluids. More particularly, this invention is directed to a dispensing container comprising a container body provided at one end with a resiliently compressible portion including a mouthpiece; a storage chamber to hold material to be dispensed; piston member arranged at the other end of said container to define a boundary of the storage chamber, the piston member being movable towards and restrained from movement away from said compressible portion; a top surface to define another boundary of the storage chamber; and an elastically compressible pump having an inlet valve in the top surface, an outlet valve, and a pump chamber between the valves, said inlet valve comprising an annular slot extending circularly in the top surface symmetrically to the longitudinal axis of the container and a circular cover ring hold sealingly in front of the annular slot and elastically under constant stress, the cover ring being held by three or more spokes radiating from a hub positioned in the center of the top surface.

9 Claims, 4 Drawing Figures

DISPENSER CONTAINER FOR VISCOUS FLUIDS

FIELD OF THE INVENTION

This invention is directed to a dispenser for viscous fluids. More particularly, this invention is directed to a dispenser having an elastically compressible diaphragm pump.

BACKGROUND OF THE INVENTION

Dispenser containers for viscous fluids are well known. For example, a dispenser for viscous cosmetics such as toothpaste or lotion is described in Kolaczinski et al., U.S. Pat. No. 4,154,371. The Kolaczinksi et al. container comprises a piston forming the bottom of the container and beind displaceable in the container; a compressible container part, lying in front of the piston, a mouthpiece, for withdrawal of the contents, of flexible and elastic material; and a delivery valve opening on excess pressure in the container. The piston is secured by a blocking pawl against any displacement causing enlargement of the interior space of the container. The delivery valve comprises a flap having an area of 0.8 $cm^2$ or less which is mounted in the mouthpiece by resilient hinge means.

A similarly useful dispenser is also described in Spatz, U.S. Pat. No. 3,361,305. The piston of the dispenser described, which piston effectively pushes out the container filling, does not require a locking means, for example, catches or ratchets, against displacement due to internal displacement or pressure in the container since, when the diaphragm pump is operated, either its inlet valve or its outlet valve is always closed and the material is introduced into the pump chamber by vacuum.

In the Spatz dispenser, several flap valves are arranged in the top surface of the container between the storage chamber of the container and the pump chamber, which flap valves are arranged substantially symmetrically to the center of the top surface. While the flap valve openings consist of holes whose surface is slightly inclined to the inside from the edge to the center of the top surface, the respective flaps are a part of a plate arranged in the pump chamber on the top surface. When the diaphragm pump of the dispenser is operated, a flexible, elastic surface is moved downward, perpendicularly to the top surface containing the flap valves in such a way that the product contained in the pump chamber is ejected or dispensed through the delivery valve of the dispenser. When the flexible, elastic surface returns to its normal, unstressed position, the delivery valve is closed because of a resulting vacuum and the inlet flap valves arranged in the top surface open in such a way that new material is drawn into the pump chamber from the interior of the container, that is, from the storage chamber, by the pressure differential, or vacuum, produced in the pump chamber.

A disadvantage of the arrangement characteristic of the Spatz device is that the flaps of the valves arranged in the top surface must be moved when the valve opens or closes exactly either in the direction of flow or opposite to the direction of flow of the product from the interior of the container into the pump chamber. The closing of the inlet flap valves as well as the opening of these valves is therefore slightly delayed, relative to the corresponding lifting phase of the diaphragm pump, in such a way that the pump chamber is only partly emptied when the product is ejected or dispensed and only is partly filled when the product is drawn in. Not only does this make operation of the pump and of the dispenser relatively difficult but also the dosing accuracy of the dispenser suffers.

OBJECTS OF THE INVENTION

It is an object of the invention to provide an improved dispenser for the discharge of quantities of viscous liquid.

It is also an object of the invention to provide a dispenser that will discharge viscous liquids in more accurate doses.

It is a further object of the invention to provide a dispensing container comprising a container body provided with a resiliently compressible portion including a mouthpiece at one end of said container body; a storage chamber to hold material to be dispensed; a piston member arranged in said container body at the other end to define a boundary of the storage chamber, the piston member being movable towards and restrained from movement away from said compressible portion; a top surface to the storage chamber; and an elastically compressible pump having an inlet valve in the top surface, an outlet valve, and a pump chamber between the valves, in inlet valve comprising an annular slot extending circularly in the top surface symmetrically to the longitudinal axis of the container, a circular cover ring held sealingly in front of the annular slot and under constant stress, the cover ring being held by three or more spokes radiating from a hub positioned in the middle of the top surface.

These and other objects of the invention will become more apparent in the discussion below.

DETAILED DESCRIPTION OF THE INVENTION

Figure 1:
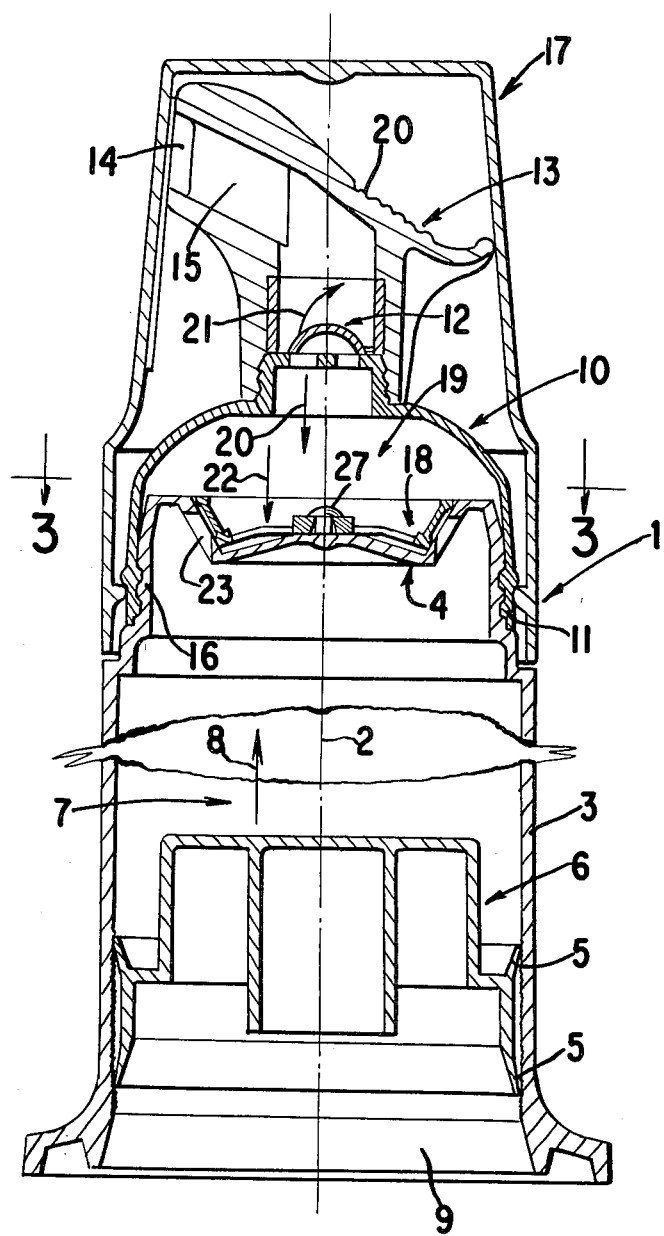
FIG. 1 represents a longitudianl cross-sectional view of an embodiment of the invention.

The invention herein is directed to providing a dispenser for viscous liquids and having an inner pump means, where the degree of filling of the diaphragm pump is increased by minimizing the valve resistance of the inlet valves of the pump chamber, thus improving the dosing accuracy of the pump and of the dispenser. The invention relates to a dispenser comprising a cylindrical container having storage chamber with a top surface and a viscous filling, such as tooth paste, and a piston bearing tightly with its circumference on the inner wall of the container, where the feed is effected by vacuum and atmospheric pressure, the piston following in the direction of the top surface. Adjacent to the storage chamber is a diaphragm pump means having an inlet valve on the top surface of the storage chamber, a dispenser delivery valve, and an elastically compressible pump chamber remaining between the valves and being closed with the exception of the valves.

More particularly, the dispenser according to the invention comprises a dispenser with a diaphragm pump having an inlet valve in the top surface of the storage chamber, the inlet valve consisting of an annular slot extending in the top surface, symmetrically to the container axis. The dispenser has a cover ring held elastically under constant stress in the pump chamber sealingly in front of the slot, the cover ring is held by at least three spokes leading radially, with regard to the hub, to be secured on the top surface of the storage chamber. Preferably all spokes have the same configuration and are formed in a bent or curved line that deviates from the radial line (with regard to the hub axis) from the hub to the cover ring. The spokes can comprise essentially semi-circular lines whose diameters of radius correspond to the radius of the inside width of the circular covering.

The circular cover ring is pressed against the annular slot of the inlet valve between the storage chamber and the pump chamber by means of the curved spokes, which are under constant, initial mechanical stress. Because of the constant stress, the valve is closed virtually immediately at the input of the pump chamber following the cycle of the diaphragm pump, while at the same time the spokes connecting the cover ring with its hub and thus fastening points can not offer a substantial resistance to the forces directed to the opening of the valve. The opening of the valve according to the invention therefore follows the corresponding pump phase almost immediately, which is particularly true when the spokes do not extend radially from the hub to the circular ring but are bent like the wings of a water wheel, that is, lead on curved lines from the hubs to the inner edge of the circular rings. This is because in opening, the circular ring then undergoes the action of a force component in circumferential direction of the hub and thus of the fastening point, that is, tangential, so that for this reason alone the ring exerts the combined action of a shearing force and thrust on the material remaining in the pump chamber when it is lifted from the valve opening. Therefore, the respective ring cycle can follow with less delay than without the shearing component.

The annular slot of the inlet valve of the pump chamber provided according to the invention in the top surface can be interrupted by some, for example, three, members which do not substantially reduce the circular surface and which serve to fasten the center part of the top surface bounding the annular slot at its inner edge, to the container. The hub of the cover ring should be affixed, for example, by riverting, to this center point. According to another feature of the invention, the cover ring can be pressed with initial stress on the rim of the annular slot of the inlet valve of the pump chamber in a way that the hub, because of the shape of a system consisting of hub, spokes, and cover ring, only can be secured at the given point of the center part of the top surface by exerting an initial stress. The system should be constrained at its outer edge in such a manner that the outer edge does not move away from the top surface or the top of the annular slot. For example, the part of the top surface adjacent to the container wall may have a lip or series of lips that keep the system in place.

According to another feature of the invention, the opening of the inlet valve leading from the interior of the container, i.e., storage chamber, to the pump chamber is inclined so far from the plane extending radially to the container axis that the annular slot is inclined toward the interior of the pump chamber in a cross section extending parallel to the longitudinal axis of the container, starting from the center part of the top surface, at an angle of about 45° to 75° from the radial. The area of the annular slot thus has the form of a truncated pyramid or funnel, widening in the direction of the storage chamber.

The cover ring is preferably attached or molded on the outer ends of the spokes, aligned substantially parallel to the area of the annular slot. The cover ring should bear sealingly on the top surface with a circumferential sealing or packing washer means inside and outside the annular slot, where the top surface is conical in known manner (with regard to the container axis), that is, substantially parallel to the ring area. This has the result that both the opening and the closing of the slotted valve in question is effected even more than usual by the influence of the spoke curvature by shearing action on the material to be pushed away in front of the valve during opening and be held back during closing.

As can be seen, the dispenser according to the invention is only fully operable when the various parts are produced with utmost precision. For example, satisfactory action of the piston provided to follow the contents of the container requires that the inner wall of the container has the prescribed cylindrical form. For a sufficient filling level of the pump chamber, the parts of the valve must have the desired symmetrical form. If the dispenser is moreover produced virtually automatically as a mass product at low cost, only injection molding can practically be used for the production of the plastic parts. This method, however, leads to homogeneous circular symmetrical castings, exactly filling the given dimensions without any bending, only if the injection molding is effected from a central, symmetrical point.

With particular regard to injection molding, a special advantage of the dispenser according to the invention is that the container, including the top surface, can be molded as a single part from the center to the top surface, hence from a central point. A particular advantage is the fact that the casting lug provided or remaining in the center part of the top surface can be used to rivet or otherwise join the center parts with the holes of the covering according to the invention. A coupling scar or a coupon piece, which can frequently only be removed at relatively great cost, is not a concern in the dispenser according to the invention because the gate mark must be used anyway for the further assembly.

Other details of the invention will be described and can be appreciated better by making reference to the embodiment of the invention set forth in FIGS. 1, 2, 3, and 4. FIG. 1 shows a dispenser 1 in a cross-section parallel to the longitudinal axis 2. Dispenser 1 consists of a substantially cylindrical container 3 with molded-on top surface, generally designated as 4. In container 3 is arranged a piston 6 which bears sealingly on the cylindrical inner wall of the container, for example, with packing washers 5, and is displaceable in the direction of longitudinal axis 2. Piston 6 functions either to push product container in interior or storage chamber 7 of the container in the direction of arrow 8 from the filling end 9 of container 3 to top surface 4 or to follow the product closely.

In the embodiment shown in FIG. 1, a flexible elastic dome 10, is secured above top surface 4, by means of fins or projections 11, for example, by snapping or screwing on. Dome 10 has at its upper end a delivery valve, generally designated as 12, on which is attached a mouthpiece 13 with cover 14 in outlet opening 15.

The entire upper part 16 including top surface 4 of container 3, the head of dispenser 1, receiving dome 10, and mouthpiece 13, can be protected with a capping cover 17, which can be snapped on.

Figure 2:
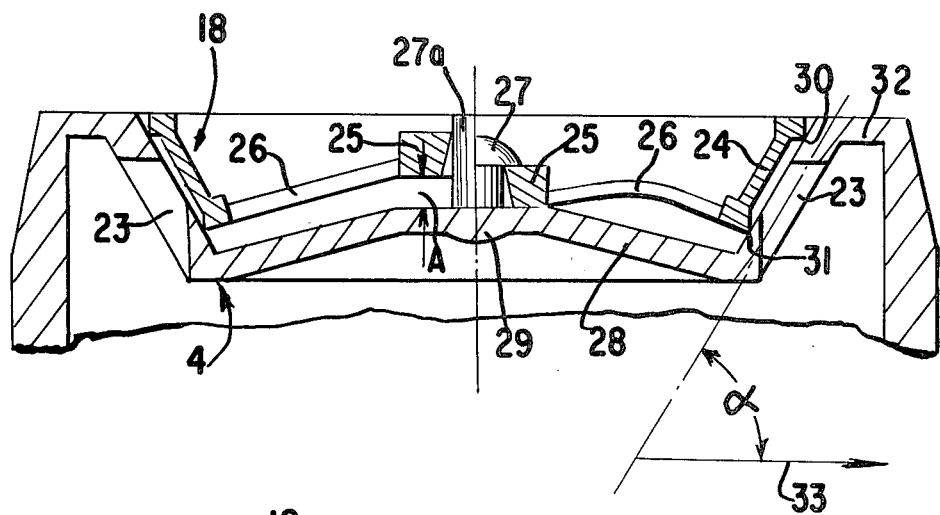
FIG. 2 represents an enlarged, longitudinal cross-sectional view through the top surface with an inlet valve of the pump chamber of an embodiment of the invention, the left-hand portion of the drawing showing the hub and spoke system with the rivet removed.
Figure 3:
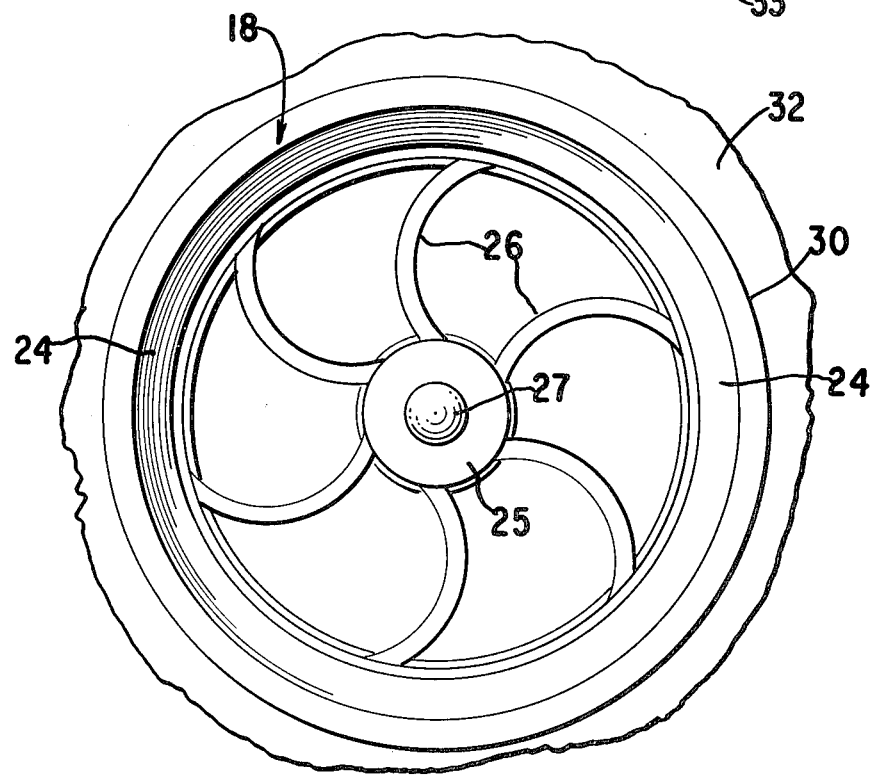
FIG. 3 represents a top view of the cover ring of an embodiment of the invention, taken along the line 3—3 on FIG. 1.

A diaphragm pump of dispenser 1 is formed by an inlet valve 18, shown more fully in FIGS. 2 and 3, a pump chamber 19, and delivery valve 12. Valves 12 and 18 are so designed that, when dome 10 is pressed in the direction of arrow 20, for example, by pressing down mouthpiece 13, valve 12, which comprises a hole or holes in a membrane covered with a hinged flapper operating in the direction of arrow 21, opens in the direction of arrow 21 and valve 18 closes in the direction of arrow 22. In subsequent relief of pressure on dome 10, dome 10 returns elastically to its original form. Due to a corresponding vacuum in pump chamber 19, valve 12 is closed in the direction opposite to arrow 21 and valve 18 is opened in the direction opposite to arrow 22. The vacuum caused in pump chamber 19 can thus only be relieved by supplying material from storage chamber 7 of container 3. As a result, the product is therefore sucked from storage chamber 7 into pump chamber 19 when the force acting on dome 10 diminishes. The product can be ejected during the next stroke or compression of the diaphragm pump when inlet valve 18 closes and outlet valve 12 opens into mouthpiece 13 and its outlet opening 15. To the extent that the product is drawn from the interior of the container into pump chamber 19, piston 6 follows naturally, being pulled or pushed by the outside air pressure in the direction of arrow 8.

According to the invention, inlet valve 18, shown in detail in FIGS. 2 and 3, comprises an annular slot 23, extending circularly in top surface 4, symmetrically to the container or longitudinal axis 2, with a circular cover ring 24 held sealingly and elastically under constant and initial stress in front of slot 23 in pump chamber 19. Cover ring 24 is held in position by at least three spokes 26 leading from a hub 25 secured axially with regard to container 3 on top surface 4. All spokes 26 should extend in the same manner on a curved or bent line from hub 25 to the inner edge of cover ring 24, deviating in the same sense from the respective radial line (with regard to longitudinal axis 2). In other words, each of spokes 26 should have the same shape or configuration.

Hub 25 can be secured by means of a rivet 27 or any other coupling means on center part 28 of the top surface 4. The fastening of hub 25 in the center of center part 28 of top surface 4 is particularly favorable because this point can be made preferably integrally with top surface 4 by injection molding. According to the invention, cover ring 24 is held with a certain initial, constant stress against annular slot 23 of top surface 4. This initial stress can advantageously be produced by deforming the wheel-type system consisting of cover ring 24, spokes 26, and hub 25 during the riveting by a certain amount A, as it is indicated in principle by the different representations of spokes 26, hub 25, and rivet 27/27a on the left and right side of FIG. 2. In practice, cover ring 24 with packing washers 30 and 31 would bear tightly on the edge zones of annular slot 23 on top surface 4 when hub 25 pushes or displaces the spokes 26 at the central area of gate mark 29 of center part 28 of top surface 4, by a small amount, for example, 1 mm, when the total diameter of cover ring 24 is about 25 mm.

Figure 4:
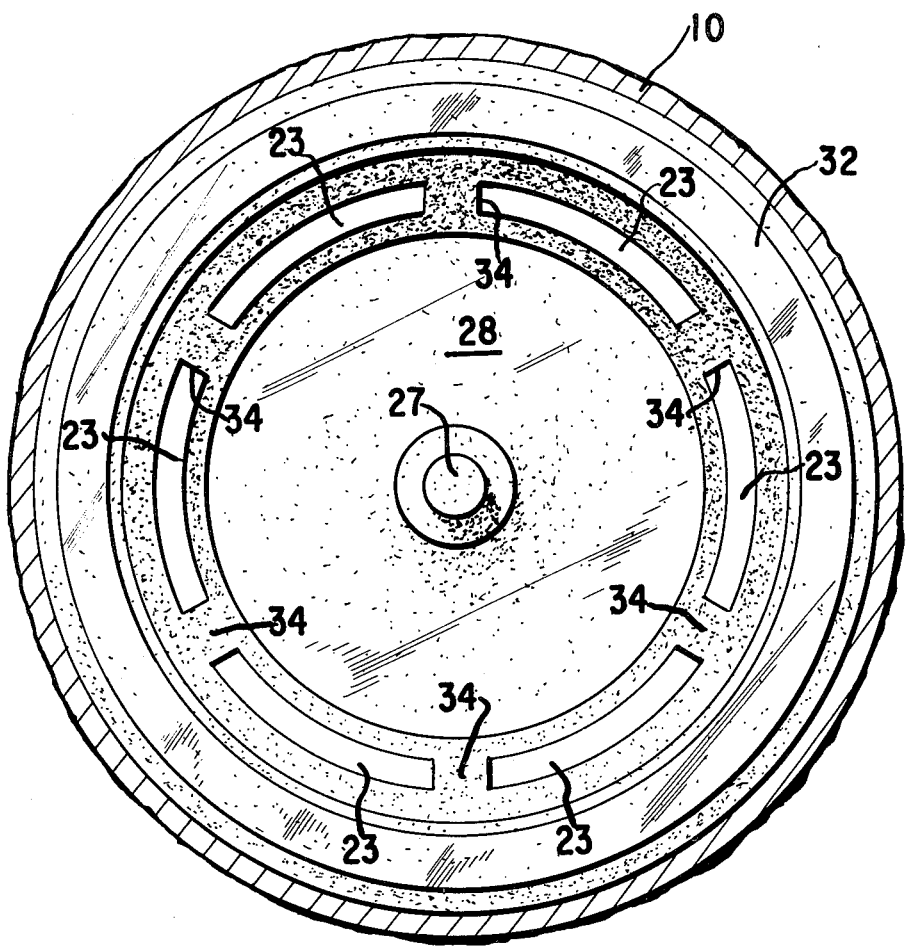
FIG. 4 represents a partial top view of the annular slot of an embodiment of the invention, as shown in FIGS. 1 and 2.

In a preferred embodiment of the invention, such as is shown in FIG. 4, annular slot 23 is interrupted by three or more fins or support members 34 which do not substantially reduce the ring area and which connect the outer edge 32 of the top surface with center part 28.

A special advantage of the dispenser according to the invention is achieved when annular slot 23 is inclined in the cross-section extending somewhat parallel to longitudinal axis 2 of the container toward pump chamber 19, starting from center part 28, particularly in an angle $\alpha$ of from about 45° to 75° from the radical direction represented by arrow 33. This inclined position, to which cover ring 24 must naturally be adapted, and the fact that the latter bears sealingly with circumferential packing washers 30 and 31 inside and outside, respectively, on annular slot 23 on top surface 4, where the top surface extends substantially conically, that is, parallel to the funnel-shaped surface of the annular slot, have the effect that the force acting during the opening and during the closing of inlet valve 18 of pump chamber 19 between the material to be displaced in the interior 7 or in pump chamber 19, on the one hand, and cover ring 24, on the other hand, must be overcome to a substantial part by shearing force. The shearing force component consists, as mentioned before, of two single components, namely one extending in circumferential direction of hub 25, that is, tangentially, and another extending substantially in the direction of the angle of inclination $\alpha$ of annular slot 23 and of cover ring 24, respectively. This shearing force component is due to the facts (i) that the cover ring is not at any point pressed areally on the edge or rim of the annular slot, but must close everywhere only along the linear packing washers, and (ii) that the packing washers 30 and 31 are conically or obliquely superposed in known manner. The pinching off of a material flow running from storage chamber 7 to pump chamber 19 during the closing of valve 18 is therefore effected by shearing off this flow by means of packing washers 30 and 31.

Container 3 with the molded-on top surface 4 can consist of an ordinary injection-molded plastic. In one embodiment it has in its cylindrical part an inside diameter of from about 15 to 50 mm, preferably about 35 mm, and a length of from about 75 to 150 mm, preferably about 110 mm. Its wall thickness can be from about 0.5 to 2.0 mm, preferably about 0.8 mm. Annular slot 23 has in an embodiment of the invention a width of from about 2 to 4 mm, preferably at least 2 mm. Cover ring 24 with hub 25 and spokes 26 preferably consists of hardened polypropylene. The bent spokes have a substantially square cross-section of from about 0.2 to 0.4 mm on a side. The dome 10 forming the elastic surface of the diaphragm pump should preferably consist of thermoplastic polyester elastomer.

As one skilled in the art would appreciate, other suitable materials may also be employed.

Other aspects of the dispenser container, in particular, operation of the piston 6 and mouthpiece 13, are described in commonly assigned, concurrently filled U.S. patent application Ser. No. 226,148 filed Jan. 19, 1981, for "Dispenser Container", incorporated herein by reference. In addition, outlet valve 12 is discussed in more detail in commonly assigned, concurrently filed U.S. patent application Ser. No. 226,147, filed Jan. 19, 1981, for "Flap Valve for a Dispenser", incorporated herein by reference.

The preceding specific embodiments are illustrative of the practice of the invention. It is to be understood, however, that other expedients known to those skilled in the art or disclosed herein, may be employed without departing from the spirit of the invention or the scope of the appended claims.

We claim:

1. A dispensing container intended for single use prepared by pressure diecasting, which comprises a container body provided at one end with a resiliently compressible portion including a mouthpiece; a storage chamber to hold material to be dispensed; a piston member arranged at the other end of said container to define a boundary of the storage chamber, the piston member being movable towards and restrained from movement away from said compressible portion; a top surface to define another boundary of the storage chamber; and an elastically compressible pump means defined by said compressible portion and by said top surface and having an inlet valve in the top surface, an outlet valve, and a pump chamber between the valves, said inlet valve comprising (1) an annular slot extending circularly in the top surface symmetrically to the longitudinal axis of the container and having a cross-section extending at an angle of from about 45° to 75° from the direction normal to the container axis and (2) a circular cover ring held sealingly in front of the annular slot and elastically under constant stress, the cover ring being held by three or more spokes radiating from a hub positioned in the center of the top surface.

2. The dispenser of claim 1, wherein all the spokes extend in the same direction on a curved line, deviating from the radial direction, from the hub to the cover ring.

3. The dispenser of claim 1, wherein the hub is connected to the center of the top surface by a rivet extending in the direction of the container axis.

4. The dispenser of claim 1, wherein the circular cover ring has been positioned by pressing the hub against the top surface and the annular slot to exert a bending force thereon.

5. The dispenser of claim 1, wherein the annular slot is interrupted by members not substantially reducing the annular surface, which members connect the outer edge of the top surface with the center part.

6. The dispenser of claim 1, wherein the cover ring is attached to the outer ends of the spokes and is aligned substantially parallel to the surface of the annular slot.

7. The dispenser of claim 1, wherein the cover ring bears sealingly with circumferential packing washer means inside and outside the annular slot on the top surface.

8. The dispenser of claim 1, wherein the junction between the hub and the center part of the top surface is a central gate mark used for injection molding of the container.

9. The dispenser of claim 1, wherein the cover ring is molded to the outer ends of the spokes and is aligned substantially parallel to the surface of the annular slot.

* * * * *